Oct. 1, 1940. J. E. OWEN 2,216,452
SEISMIC SURVEYING
Original Filed May 27, 1938  2 Sheets-Sheet 1
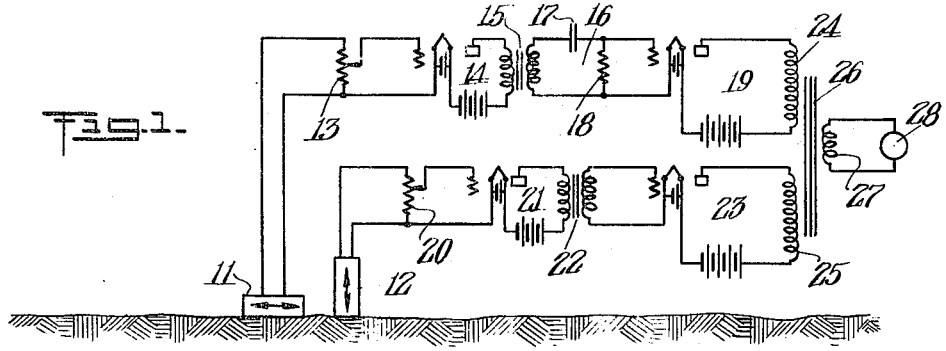
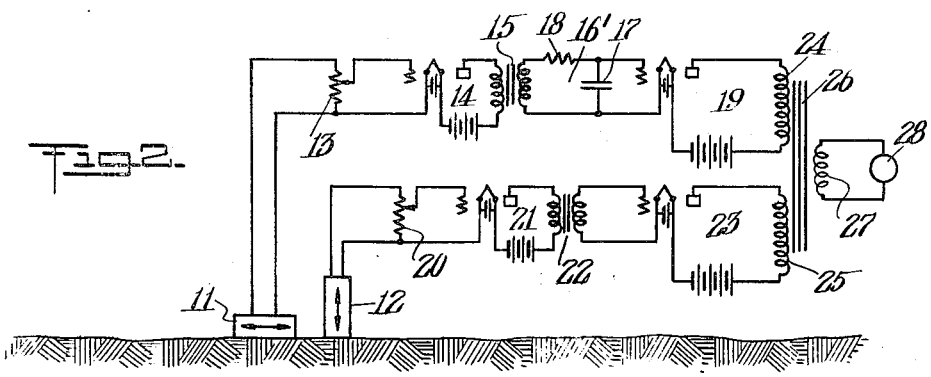
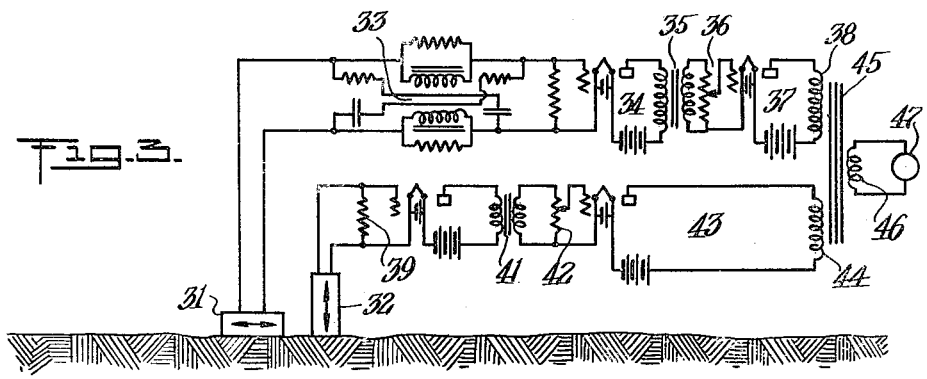
INVENTOR.
John E. Owen
BY Kenyon & Kenyon
ATTORNEYS.

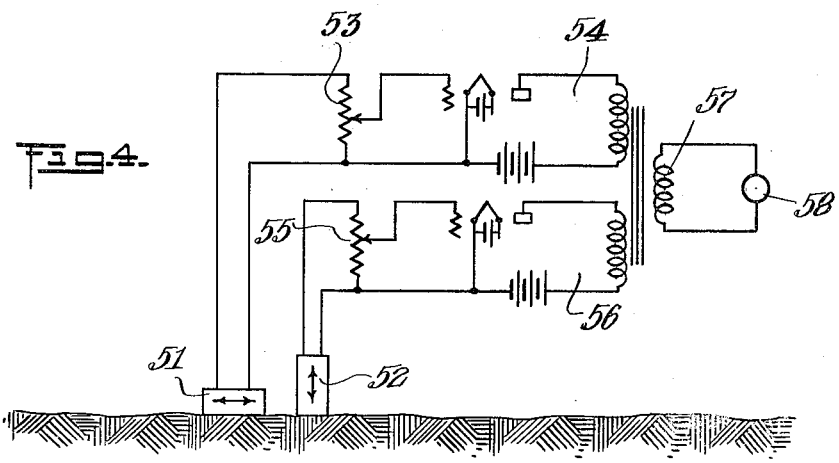

UNITED STATES PATENT OFFICE 2,216,452

SEISMIC SURVEYING

John E. Owen, Tulsa, Okla., assignor to Geophysical Research Corporation, New York, N. Y., a corporation of New Jersey Application May 27, 1938, Serial No. 210,349
Renewed July 2, 1940

10 Claims. (Cl. 181—0.5)

This invention relates to seismic surveying.

In the reflection wave method of seismic surveying, the reflection wave record is complicated by the effects produce by surface waves generated at the explosion of the shot unless provision is made for elimination of such effects from the record.

An object of this invention is a method of eliminating the objectionable effects of surface waves from a reflection wave record.

The surface waves above referred to are the waves commonly known as "ground roll" and are of large amplitude and low frequency and travel out from the shot point along the surface of the earth. These waves are closely analogous to the surface waves known as "Rayleigh" waves which are a well-known type of wave produced as a result of natural earth quakes. The earth particles executing such a wave motion move over an elliptical path and the motion of a particle is retrograde with respect to the direction of propagation of the wave.

According to the present invention, two geophones are provided at the recording station, and are arranged one in a vertical position and the other in a horizontal position with its axis pointed toward the shot point. The first or vertical geophone will respond only to vertical motion while the second or horizontal geophone will respond only to horizontal motion. The displacement of both geophones when actuated by ground roll is the vector sum of a horizontal and a vertical component of displacement 90° out of phase. Since the motion is elliptical, the two components of the displacement may be represented by $$x = B \cos \omega t$$
$$z = A \sin \omega t$$

where $A$ = maximum amplitude of the vertical component of the motion.
$B$ = maximum amplitude of the horizontal component of the motion.
$x$ = horizontal displacement at time $t$.
$z$ = vertical displacement at time $t$.
$\omega = 2\pi f$, where $f$ = frequency of motion in cycles per second.

Since the vertical geophone responds only to the vertical component, its output will be proportional to $A \sin \omega t$. Similarly, the output of the horizontal geophones will be proportional to $B \cos \omega t$.

The output from the horizontal geophone is fed through an electrical circuit which performs upon it an operation equivalent to differentiating, so that the altered output will be proportional to the time derivative of $B \cos \omega t$ which is $-B\omega \sin \omega t$. This altered output is then combined with the unaltered output of the vertical geophone. The sum of the altered output of the horizontal geophone and the output of the vertical geophone is expressed as follows:

$$e = A (\sin \omega t) - B\omega (\sin \omega t)$$
$$= (A - B\omega) \sin \omega t$$

The effect of the surface waves is completely eliminated by making the combined output equal to zero which is accomplished by making $A = B\omega$ which in turn is very simply accomplished merely by adjusting the relative amplitudes of the two components by means of suitable controls on the recording amplifiers.

The above-described balancing may be accomplished equally well by running the output from one of the geophones through an electrical circuit which performs an operation equivalent to integrating and then combining such altered output with the output of the other geophone. For example, by integrating $B \cos \omega t$ which represents the output of the horizontal geophone, there is obtained the expression $$\frac{B}{\omega} \sin \omega t$$

By combining the integrated output of the horizontal geophone with the output of the vertical geophone, but 180° out of phase, such combined output is expressed as follows:

$$e = A \sin \omega t - \frac{B}{\omega} \sin \omega t$$
$$= \left(A - \frac{B}{\omega}\right) \sin \omega t$$

The condition of balance obtained by making $$A = \frac{B}{\omega}$$

which condition is again obtained by adjusting the relative amplitude of the two components.

The two geophones are acted upon by the reflected waves coming nearly vertical from below, but only the vertical geophone is responsive to such waves. The reflected waves are therefore recorded in the usual fashion while the ground roll is balanced out.

It is obvious from the foregoing description that a balance can be obtained for only a single frequency by the arrangement just described and hat this frequency may be adjusted to the predominating frequency of the ground roll merely by varying the amplitudes of the two geophone outputs. Usually, most of the energy contained in ground roll does reside in a band close to one predominating frequency so that the above system works quite well. It is true, however, that ground roll is transient in nature and for that reason does carry energy in a large number of frequencies so that to balance it out completely a more elaborate system must be used. In such more elaborate system, the output from one of the geophones is fed into a phase shifting network, which is so designed that it shifts the phase of practically all frequencies contained in a wave fed through it by approximately 90°. The altered output thus obtained is then combined with the unaltered output of the second geophone and the relative amplitudes are adjusted to give a balance.

Other objects, novel features and advantages of this invention will become apparent from the following specification and accompanying drawings, wherein:

Figs. 1, 2, 3 and 4 are diagrammatic illustrations of different embodiments of the apparatus of the invention.

In the embodiment illustrated in Fig. 1, two geophones 11 and 12 are provided at the receiving station of which 11 is arranged in a horizontal plane with its axis pointing toward the shot point and the geophone 12 is arranged in a vertical position. The output of the geophone 11 is connected through a voltage divider 13 across the input of a vacuum tube amplifier 14. The output circuit of the amplifier 14 is connected through the transformer 15 with a differentiating network 16 consisting of a condenser 17 in combination with a bridged resistance 18, the output of the network being connected across the input of a second vacuum tube amplifier 19. The geophone 12 is connected through a voltage divider 20 between the input terminals of a vacuum tube amplifier 21. The output circuit of the vacuum tube amplifier 21 is connected through a transformer 22 with the input circuit of a vacuum tube amplifier 23. The output circuit of the amplifier 19 includes a winding 24 which constitutes one part of the primary of a transformer 26, while the output circuit of the amplifier 23 includes a winding 25 which constitutes the remainder of the primary of said transformer. The secondary winding 27 of the transformer is connected to a recording galvanometer 28 of the type which makes but a single trace. The secondary winding of the transformer 26 is connected to a recording galvanometer 28.

The system illustrated in Fig. 2 is similar to that illustrated in Fig. 1, except that the differentiating network 16 of Fig. 1 is replaced by the integrating network 16', consisting of a resistance 18 bridged by a condenser 17.

Considering the differentiating network in Fig. 1, the input voltage $e_1(t)$ produces a current through the condenser 17 and resistance 18 which may be termed $i(t)$. The reactance of the condenser 17 is very large compared with the resistance 18 so that the current $i(t)$ is determined primarily by the value of the condenser 17, i. e., it will be approximately 90° out of phase with the exciting voltage and will be proportional to frequency. The output voltage $e_2(t)$ being equal to $i(t) R$ (R being the value of the resistance 18), will, therefore, be also 90° out of phase with $e_1(t)$ and will be proportional to frequency. In other words, the voltage $e_2(t)$ will approximate the time derivative of the voltage $e_1(t)$.

In the integrating network of Fig. 2, the values of 17 and 18 are so proportioned that for the frequency involved, the value of the resistance 18 is high compared with the reactance of the condenser 17. The current $i(t)$ flowing through the circuit will then be very nearly in phase with the exciting voltage and approximately equal in value to $$\frac{e_1(t)}{R}$$

(R being the value of resistance 18). The voltage, $e_2(t)$, across the condenser is then $$\frac{1}{c}\int i(t)dt$$

or $$\frac{1}{CR}\int e_1(t)dt$$

approximately (C being the reactance of the condenser 17).

In the system illustrated in Fig. 3, the output of the horizontal geophone 31 is connected through a phase shifting network 33 to the input of the vacuum tube amplifier 34. This network is the same as that shown and described in an article by O. J. Zobel in the Bell System Technical Journal, volume VII, No. 3, page 514. By properly choosing the constants of this network, it may be made to give a phase shift of approximately 90° for all frequencies above an arbitrarily assigned frequency which, for the purpose of this invention, may be set somewhere in the neighborhood of 5 cycles. The phase shift is obtained, with a practically flat frequency characteristic or, in other words, there is no appreciable frequency distortion. The output of amplifier 34 is connected through a transformer 35 and voltage divider 36 across the input of a vacuum tube amplifier 37 having a winding 38 in its output. The vertical geophone 32 is coupled through the intermediary of the resistance 39 to the input of a vacuum tube amplifier 40. The output of the vacuum tube amplifier is connected through the transformer 41 and voltage divider 42 to the input of a vacuum tube amplifier 43. The output circuit of amplifier 37 includes a winding 38 which constitutes one part of the primary for the transformer 45 and the output of amplifier 43 includes a winding 44 which constitutes the remainder of the primary of said transformer. The secondary winding 46 of said transformer is connected to the recording galvanometer 47 of the type which makes but a single trace.

The amplifiers 19 and 23 of Figs. 1 and 2 are properly adjusted to equalize the amplitude of the amplified and altered surface wave components of the geophone outputs so that these components balance each other out and have no effect upon the recorder. The amplifiers 37 and 43 of Fig. 3 are likewise properly adjusted to have the same effect.

In the system illustrated in Fig. 4, 51 is either a displacement geophone or a velocity geophone arranged in such position as to be responsive only to horizontal motion while 52 is either a velocity geophone or an acceleration geophone arranged to be responsive only to vertical movement. The output from the geophone 51 is impressed through the voltage divider 53 upon the input of an amplifier 54 which may consist of one or more stages of amplification. The output from the geophone 52 is impressed through the voltage divider 55 upon the input of an amplifier 56 which may consist of one or more stages of amplification. The outputs of the two amplifiers 54 and 56 are impressed through the transformer 57 on the recorder 58.

In the above-described system, one geophone may act as a displacement meter for the range of frequencies contained in the ground roll while the other may act as a velocity meter for the same range of frequencies. Since velocity is the time derivative of displacement and conversely displacement is the integral of velocity, the outputs of these geophones after suitable adjustment of amplitude may be added directly together to obtain elimination of ground roll in the manner described. This modification has the advantage of simplifying the electrical circuit required in the recording channel by permitting the omission of the integrating or differentiating circuit. Also, in the system just described, the velocity type geophone may be paired with a geoplane the response of which is proportional to the acceleration of the earth's motion. In this case, the same effect will be obtained, since acceleration is the time derivative of displacement and conversely velocity is the integral of acceleration.

It is of course understood that various modifications may be made in the apparatus above described, without in any way departing from the spirit of the invention as defined in the appended claims. Furthermore, it is intended that the claims shall cover all such modifications as fall within the scope of their terminology. The term "geophone" is used to cover all types of devices which may be used in seismic surveying for translating earth vibrations into electrical waves.

I claim:

1. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, adjusting said electrical waves to bring the surface wave components thereof into proper relationship substantially to cancel each other when combined, combining the adjusted electrical waves and recording the resultant wave form.

2. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, adjusting said electrical waves to bring the electrical wave component corresponding to the horizontal component of the surface wave earth motion into proper relation with the electrical wave component corresponding to the vertical component of the surface wave earth motion substantially to cancel each other when combined, combining the adjusted electrical waves and recording the resultant wave form.

3. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting said separately detected earth motion components into corresponding electrical waves of which one electrical wave is the time derivative of the other electrical wave, adjusting said electrical waves to equalize the amplitude of the surface wave components thereof, combining the adjusted electrical waves in such relation as to cancel said surface wave components and recording the resultant wave form.

4. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, altering one electrical wave to make the surface wave components of both electrical waves proportional to the same trigonometric function but of different sign, effecting adjustment of the altered and unaltered electrical waves to bring their surface wave components to the same amplitude, combining the adjusted electrical waves and recording the resultant wave form.

5. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, subjecting one electrical wave to differentiation to make both electrical waves proportional to the same trigonometric function but of different sign, effecting adjustment of the altered and unaltered electrical waves to bring their surface wave components to the same amplitude, combining the adjusted electrical waves and recording the resultant wave form.

6. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, subjecting one electrical wave to integration to make the surface wave components of both electrical waves proportional to the same trigonometric function but of different sign, effecting adjustment of the altered and unaltered electrical waves to bring their surface wave components to the same amplitude, combining the adjusted electrical waves and recording the resultant wave form.

7. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, altering the electrical wave corresponding to the horizontal component of the surface wave earth motion to make the surface wave components of both electrical waves proportional to the same trigonometric function but of different sign, effecting adjustment of the altered and unaltered electrical waves to bring their surface wave components to the same amplitude, combining the adjusted electrical waves and recording the resultant wave formed.

8. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, subjecting the electrical wave corresponding to the horizontal component to the surface wave earth motion to differentiation to make the surface wave components of both electrical waves proportional to the same trigonometric function but of different sign, effecting adjustment of the altered and unaltered electrical waves to bring their surface wave components to the same amplitude, combining the adjusted electrical waves and recording the resultant wave form.

9. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, subjecting the electrical wave corresponding to the horizontal component of the surface wave earth motion to integration to make the surface wave components of both electrical waves proportional to the same trigonometric function but of different sign, effecting adjustment of the altered and unaltered electrical waves to bring their surface wave components to the same amplitude, combining the adjusted electrical waves and recording the resultant wave form.

10. The method of seismic surveying which comprises creating a source of seismic waves at the earth's surface, separately detecting the vertical and horizontal components of the resulting earth motion at a point on the earth's surface, said earth motion being the resultant of motions produced by surface waves, by refracted waves and by reflected waves, converting each of said detected earth motion components into a corresponding electrical wave, adjusting said electrical waves to make the surface wave component of one electrical wave equal in amplitude but 180° out of phase with the surface wave component of the other electrical wave, combining the adjusted electrical waves and recording the resultant wave form.

JOHN E. OWEN.